(12) United States Patent
Ai

(10) Patent No.: US 8,649,487 B2
(45) Date of Patent: Feb. 11, 2014

(54) VIDEO IMPLEMENTATION METHOD FOR THREE-PARTY VIDEO CONFERENCE

(75) Inventor: Zhimin Ai, Xiamen (CN)

(73) Assignee: Xiamen Yealink Network Technology Co., Ltd., Xiamen, Fujian (CN)

( * ) Notice: Subject to any disclaimer, the term of this patent is extended or adjusted under 35 U.S.C. 154(b) by 132 days.

(21) Appl. No.: 13/439,847

(22) Filed: Apr. 5, 2012

(65) Prior Publication Data

US 2013/0265381 A1   Oct. 10, 2013

(51) Int. Cl.
*H04M 11/00* (2006.01)
(52) U.S. Cl.
USPC ..................... 379/93.21; 348/14.08
(58) Field of Classification Search
USPC ............... 379/93.21, 158, 202.01; 348/14.01, 348/14.08
See application file for complete search history.

(56) References Cited

U.S. PATENT DOCUMENTS

2013/0250035 A1*  9/2013  Murali et al. ............... 348/14.09

* cited by examiner

*Primary Examiner* — Olisa Anwah

(57) ABSTRACT

The present invention relates to a three-party video conference. With the utilization of the monitor display resource by a host party, the assembled three-party video captured and decoded by the monitor display resource is transmitted to the conference-participant parties, the screen-captured real-time transport protocol (RTP) data transmitted from the host party are respectively displayed on monitors of the conference-participant parties, thereby eliminating the resource consumption of mixed video data, controlling the video resource loss, and providing a cost-effective hardware to enable three parties to see and hear from each other.

2 Claims, 4 Drawing Sheets

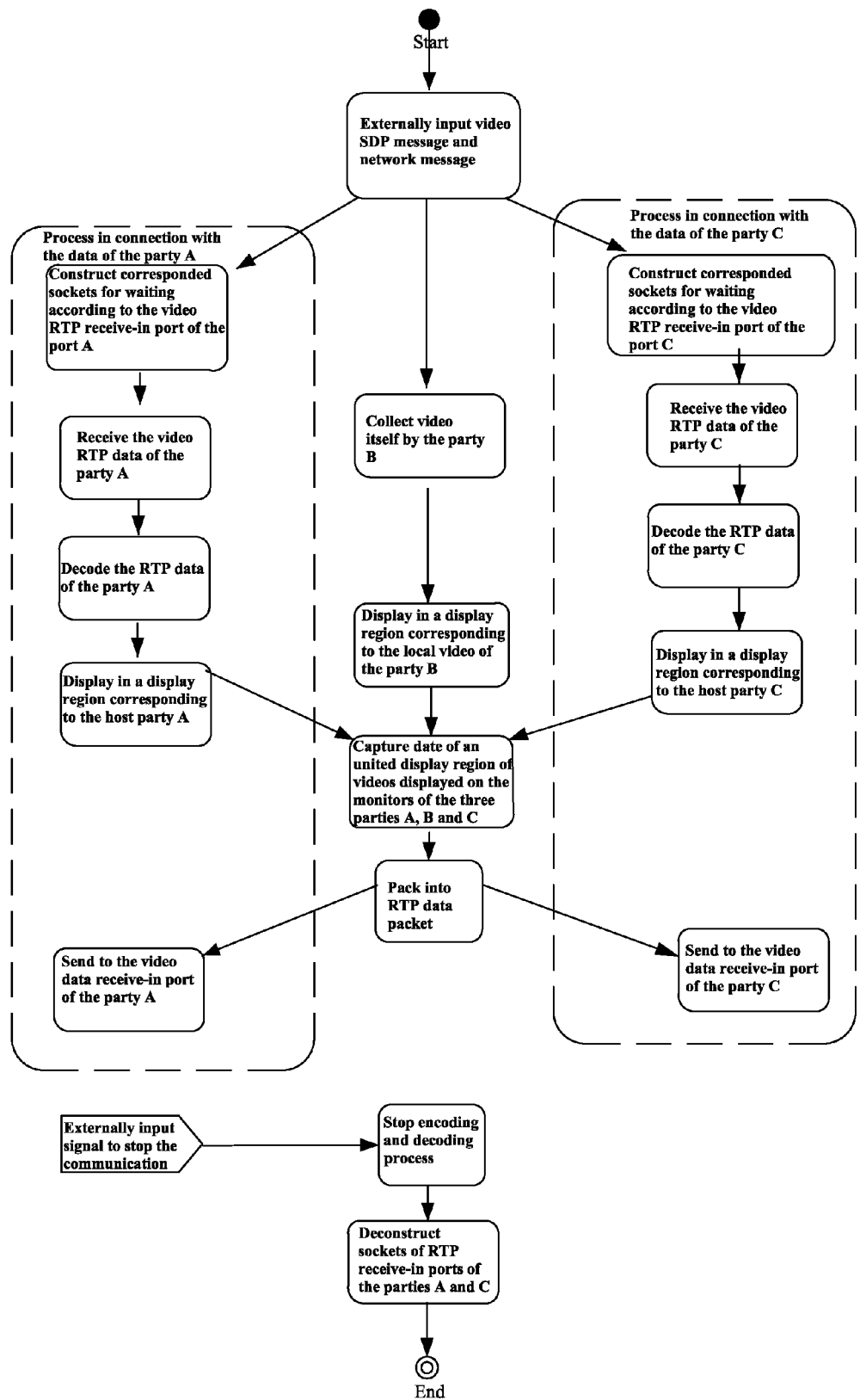
F I G. 5

VIDEO IMPLEMENTATION METHOD FOR THREE-PARTY VIDEO CONFERENCE

BACKGROUND OF THE INVENTION

1. Field of the Invention

The present invention relates to a video implementation method for a three-party video conference.

2. Description of the Related Art

Audio conference facilities are the majority of three-party conference functions supported in current market. As to video conference facilities, due to high-demanded hardware for realizing function algorithm of three-party video conference, video conference facilities generally have increased total cost, much higher than that of the audio conference facilities.

In traditional three-party conference facilities, it is known that, after receiving a mixed real-time transport protocol (RTP) data transmitted from the two parties, a host party transmits data to the two parties for realizing the three-party conference, in which the audio and video realization methods are individually different from each other. The audio and video realization types of the three-party conference function are described as follows.

Realization Method for Traditional Audio Conference

As shown in FIG. 1, no direct data transmission is formed between the two parties 'A' and 'C', i.e., with the host party served as an intermediate station, the data of the host party 'B' together with the data of the third party are mixed and transmitted to the second party, and it is understood that the host party 'B' plays a very important role on processing data. Furthermore, because the processing of the audio data is relatively simple, it is basically that two threads are enough for the data mixing process. The three-party audio conference of the host party 'B' includes the steps of:

in step (1), constructing sockets of RTP receive-in ports for the two parties 'A' and 'C' and performing monitoring and waiting by the host party 'B';

in step (2), using the host party 'B' to sample audio data thereof;

in step (3), receiving RTP audio data transmitted from the party 'A' by the host party 'B', outputting the audio data through a speaker after the received RTP audio data are decoded, and transmitting a RTP data packet which is packed from the mixed data of the decoded audio data and the audio data of the host party 'B' to the RTP receive-in ports of the party 'C' while negotiating network parameters;

in step (4) which is simultaneously performed with the step (3), receiving RTP audio data transmitted from the party 'C' by the host party 'B', outputting the audio data through the speaker after the received RTP audio data are decoded, and transmitting a RTP data packet which is packed from the mixed data of the decoded audio data and the audio data of the host party 'B' to the RTP receive-in ports of the party 'A' while negotiating network parameters; and in step (5), forming a three-party audio conference, in which the mixed voice of the two parties 'B/C' can be heard from the party 'A', the mixed voice of the two parties 'A/C' can be heard from the party 'B', and the mixed voice of the two parties 'A/B' can be heard from the party 'C'.

Realization Method for Traditional Video Conference

Regardless of hardware cost, the video conference is actually feasible according to the method of the above-described audio conference, and the effect of one party observing the other party and the host party can be achieved. However, due to high-demanded hardware for realizing three-party video conference, the majority of video telephone sets are not provided with this effect in the three-party video conference.

Alternatively, in the specification of the common telephone sets, each of three parties can hear from the other two parties' voices, each of the conference-participant parties can observe the video of the host party, and the host party can observe the video of one of the conference-participant parties.

In the three-party video conference, the data mixing process has the most resource consumption and complication. As shown in FIG. 2, the host party 'B' eliminates the video data mixing process, and the ways for processing data of the two parties 'A/C' by the host party 'B' are distinct. As to the video calls, due to the CPU resource consumption in the data receiving process relatively less than that in the data decoding process, it is most effective to save resource by reducing the decoding process, the decoding process to the non-current activated data of the party 'C' is eliminated, and the critical frame is preserved for the decoding normality in the subsequent reviewing process. At this moment, the CPU resource consumption is the sum of three-party audio conference, single-channel pure video call, and single-channel RTP data receiving process, and it is basically that audio mixing resource consumption is additionally provided in comparison with the single-channel audio/video call.

The three-party video conference of the host party 'B' includes the steps of (referring to the above-described implementation method of the audio conference for the audio processing steps):

in step (1), constructing sockets of RTP receive-in ports for the two parties 'A' and 'C' and performing monitoring and waiting by the host party 'B';

in step (2), using the host party 'B' to sample and pack video picture thereof into a RTP data packet to be respectively transmitted to the RTP receive-in ports of the parties 'A' and 'C' while negotiating network parameters;

in step (3), receiving RTP data transmitted from the party 'A' by the host party 'B' and displaying the decoded RTP data on FrameBuffer of the monitor to be observed by the client if the video of the party 'A' configured by the host party 'B' is presumed as a current displaying main video;

in step (4) which is simultaneously performed with the step (3), receiving RTP data transmitted from the party 'C' and merely preserving I frame data of critical frame without decoding the received RTP data by the host party 'B', in which the I frame data of critical frame is utilized to perform decoding compensation when switching the video of the party 'C' as the main video so as to prevent mosaic phenomenon appeared when the video of the party 'C' is initially displayed;

in step (5), requesting the party 'C' to resend I frame by the host party 'B' by utilizing communication control protocol (SIP protocol or self-defined protocol) if the video of the party 'C' configured by the host party 'B' is presumed as the main video, and updating the video picture and processing the data of the parties A and C for switching process.

Although the above-described measure can solve the problem of resource shortage, several problems still exist as following:

(A) The most important principle cannot be achieved because one party cannot observe the video information of another participant party, but three parties can hear from each other;

(B) The host party generally can only observe the video of one of the participant parties. It is inconvenient to further perform a switching process if the host party wants to observe the video of the other participant party.

BRIEF SUMMARY OF THE INVENTION

The purpose of the present invention is to provide a video implementation method for a three-party video conference, capable of being operated by cost-effective hardware to enable three parties to see and hear from each other.

The present invention is a video implementation method for a three-party video conference, comprising the steps of:

in a first step, constructing sockets of real-time transport protocol receive-in ports in connection with conference-participant parties 'A' and 'C' and performing monitoring and waiting by a host party 'B';

in a second step, using the host party 'B' to sample a video picture thereof and displaying a video of the host party 'B' in a display region corresponding to the host party 'B' on a monitor of the host party 'B';

in a third step, receiving real-time transport protocol data transmitted from the conference-participant party 'A' by the host party 'B' and displaying a video of the conference-participant party 'A' in a display region corresponding to the conference-participant party 'A' on the monitor of the host party 'B' when the real-time transport protocol data are decoded;

in a fourth step which is simultaneously performed with the third step, receiving real-time transport protocol data transmitted from the conference-participant party 'C' by the host party 'B' and displaying a video of the conference-participant party 'C' in a display region corresponding to the conference-participant party 'C' on the monitor of the host party 'B' when the real-time transport protocol data are decoded;

in a fifth step, capturing an united display region which the united display region is consisted of the display regions of the host party 'B' and the conference-participant parties 'A' and 'C' of the three parties on the monitor thereof by the host party 'B' to be packed into a real-time transport protocol data packet and to be respectively transmitted to the real-time transport protocol receive-in ports of the conference-participant parties 'A' and 'C' while negotiating network parameters; and in a sixth step, decoding the screen-captured real-time transport protocol data transmitted from the host party 'B' by the conference-participant parties 'A' and 'C' to respectively display on monitors of the conference-participant parties 'A' and 'C'.

The present invention further separates a receiving-sending packet processing step from an encoding-decoding processing step, comprising:

after the sockets of real-time transport protocol receive-in ports for the conference-participant parties 'A' and 'C' are constructed in the first step, constructing an independent thread T1 by the host party 'B' to receive the real-time transport protocol data packet coming from the conference-participant parties 'A' or 'C' and to respectively place the real-time transport protocol data packets coming from the conference-participant parties 'A' and 'C' in two different common queues, applying an access lock to the data of the common queues before the independent thread T1 receives the real-time transport protocol data packet coming from the conference-participant parties 'A' or 'C', releasing the access lock from the data of the common queues after the independent thread T1 receives the real-time transport protocol data packet coming from the conference-participant parties 'A' or 'C', and utilizing the access lock perform access synchronization together with a following decoding thread;

providing another independent decoding thread T2 to acquire the data in the two common queues by timing, retrieving all data from the two common queues to simultaneously decode a plurality of data packets related to an entire frame of pattern to determine an amount of the data packets presently stacked in the common queues before retrieving the data each time, removing a central non-critical frame to directly decode I frame by the independent decoding thread T2 if the amount of the data packets stacked in the common queues is greater than a threshold value, applying an access lock to the data of the common queues before retrieving the decoded I frame, and releasing the access lock from the data of the common queues after the decoding of the I frame is completed;

determining an amount of the data packets presently stacked in the common queues by the independent decoding thread T2 before retrieving the data each time in the decoding process, directly transmitting a real-time transport protocol data packet rate control command to a data send side by a real time control protocol signal of the independent decoding thread T2 if the amount of the data packets stacked in the common queues is greater than a threshold value so as to ask for lowering transmission speed of the real-time transport protocol data packet; and performing an encoding process according to the above-described steps.

The present invention relates to a three-party video conference. With the utilization of the monitor display resource by a host party, the assembled three-party video captured and decoded by the monitor display resource is transmitted to the conference-participant parties, the screen-captured real-time transport protocol data transmitted from the host party are respectively displayed on monitors of the conference-participant parties, thereby eliminating the resource consumption of mixed video data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 5 is a principle schematic view of a realization approach of a video conference of the present invention.

DETAILED DESCRIPTION OF THE INVENTION

Figure 1:
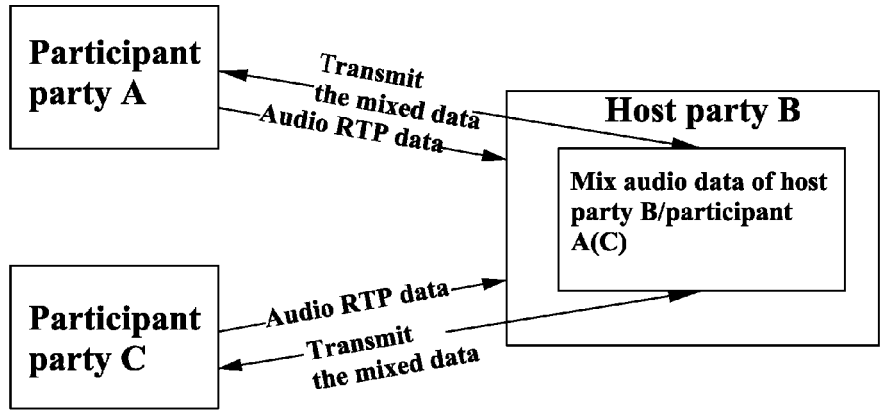
FIG. 1 is a principle schematic view of a realization approach of a conventional audio conference.
Figure 2:
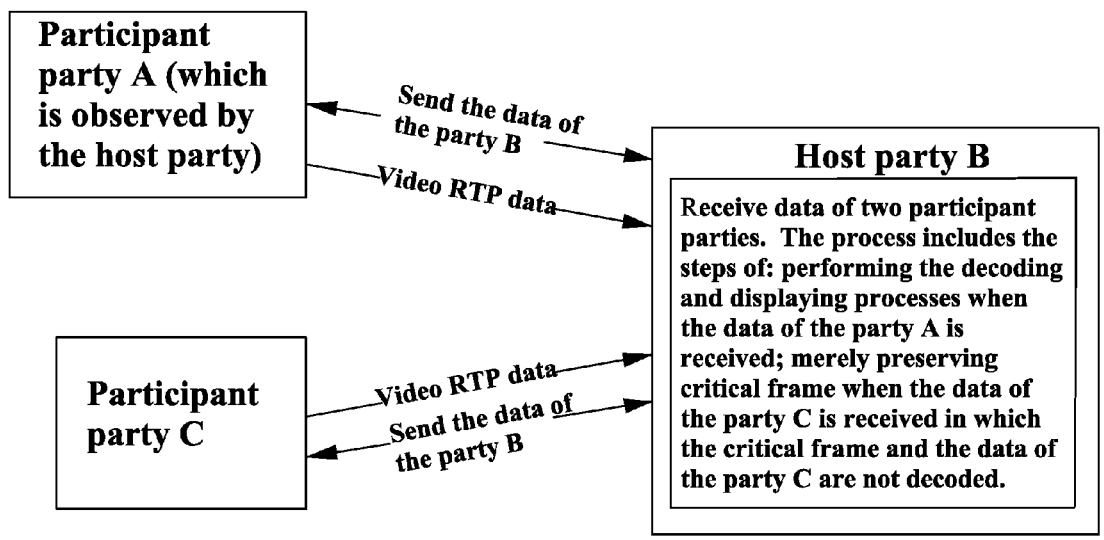
FIG. 2 is a principle schematic view of a realization approach of a conventional video conference.
Figure 3:
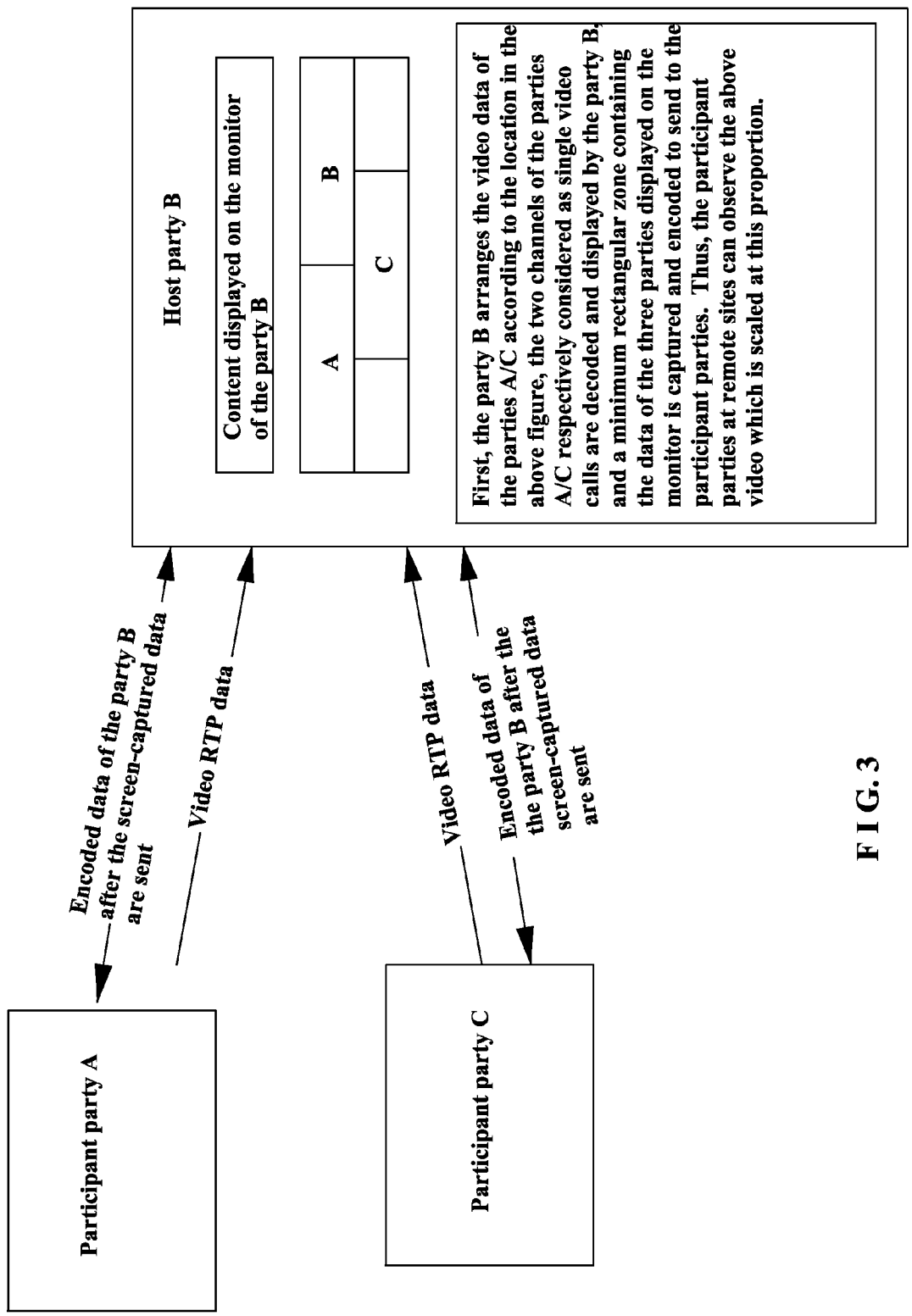
FIG. 3 is a schematic view of a flowchart of the present invention.

As shown in FIGS. 3 and 5, a video implementation method for a three-party video conference of the present invention physically comprises the steps of:

in a first step, constructing sockets of real-time transport protocol (RTP) receive-in ports in connection with conference-participant parties 'A' and 'C' and performing monitoring and waiting by a host party 'B';

in a second step, using the host party 'B' to sample a video picture thereof and displaying a video of the host party 'B' in a display region corresponding to the host party 'B' on a monitor of the host party 'B';

in a third step, receiving RTP data transmitted from the conference-participant party 'A' by the host party 'B' and displaying a video of the conference-participant party 'A' in a display region corresponding to the conference-participant party 'A' on the monitor of the host party 'B' when the RTP data are decoded;

in a fourth step which is simultaneously performed with the third step, receiving RTP data transmitted from the conference-participant party 'C' by the host party 'B' and displaying a video of the conference-participant party 'C' in a display region corresponding to the conference-participant party 'C' on the monitor of the host party 'B' when the RTP data are decoded;

in a fifth step, capturing an united display region which the united display region (it can be rectangular shape as shown in FIG. 3) is consisted of the display regions of the host party 'B' and the conference-participant parties 'A' and 'C' of the three parties on the monitor thereof by the host party 'B' to be packed into a RTP data packet and to be respectively transmitted to the RTP receive-in ports of the conference-participant parties 'A' and 'C' while negotiating network parameters; and in a sixth step, decoding the screen-captured RTP data transmitted from the host party 'B' by the conference-participant parties 'A' and 'C' to respectively display on monitors of the conference-participant parties 'A' and 'C'.

In the video implementation method for the three-party video conference of the present invention, with the utilization of the monitor display resource by the host party, the assembled three-party video captured and decoded by the monitor display resource is transmitted to the conference-participant parties, thereby eliminating the resource consumption of mixed video data. According to the CPU resource consumption calculation shown in FIG. 3, the present invention can meet the requirements to allow the three parties to see each other, but the resource consumption presently is still additionally provided with one channel video call decoding compared to other telephone sets. However, the resource request of the video call for decoding the video is relatively high, particularly of using H264-Codec in which H264 already becomes the mainstream codec used in the video calls. Therefore, it is necessary to again reduce the resource consumption rate by advanced improvements.

As shown in FIG. 3, the CPU resource consumption is the sum of three-party audio conference, two-channel pure video call decoding, screen capture, single-channel video encoding and basic network receiving-sending packet. According to the CPU resource consumption of the present invention, due to the relatively low of resource consumption of the screen capture and the data caching method which is already optimized in the operation process, it is understood that the key point lies in how to make good use of the decoding resource, and the solution for this problem is to improve the decoding algorithm. However, due to the current decoding algorithms having bee fully developed, the compatibility issues will be occurred if amending the decoding algorithms. On the other hand, if it tries to have an improvement on reducing the resource consumption in the decoding process in which only the encoding and network transmission processes are belonged to the long-term operations, there will have the same result as the above-described decoding process because the modification in the encoding process is similar to that in the decoding process. Thus, it is possible to have an improvement on reducing the resource consumption in the network transmission process.

First of all, it is impossible to reduce the network transmission speed and to eliminate the transmission of network packets, but it is allowed to have an improvement on how to avoid resource consumption of a network transmission peak value. Because the network send and receive are combined with encoding-decoding processes, i.e., the network send and receive are processed in the same channel, the speed of the decoding process is affected by the receiving-sending packet.

Figure 4:
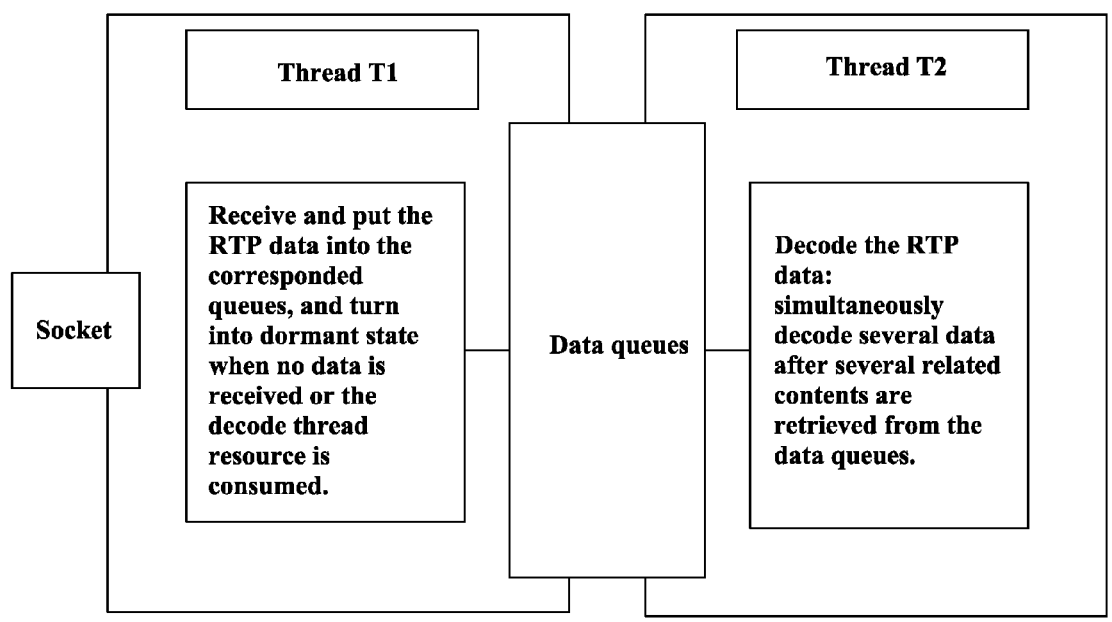
FIG. 4 is a principle schematic view of a further modified embodiment of the present invention.

As shown in FIG. 4, the present invention further separate a receiving-sending packet processing step from an encoding-decoding processing step:

after the sockets of RTP receive-in ports for the conference-participant parties 'A' and 'C' are constructed in the first step, constructing an independent thread T1 by the host party 'B' to receive the RTP data packet coming from the conference-participant parties 'A' or 'C' and to respectively place the RTP data packets coming from the conference-participant parties 'A' and 'C' in two different common queues, applying an access lock to the data of the common queues before the independent thread T1 receives the RTP data packet coming from the conference-participant parties 'A' or 'C', releasing the access lock from the data of the common queues after the independent thread T1 receives the RTP data packet coming from the conference-participant parties 'A' or 'C', and utilizing the access lock perform access synchronization together with a following decoding thread;

providing another independent decoding thread T2 to acquire the data in the two common queues by timing, retrieving all data from the two common queues to simultaneously decode a plurality of data packets (i.e., an entire frame of pattern, generally amounted to about six data packets) to determine an amount of the data packets presently stacked in the common queues before retrieving the data each time, removing a central non-critical frame (i.e., non-I frame) to directly decode I frame by the independent decoding thread T2 if the amount of the data packets stacked in the common queues is greater than twenty data packets (a threshold value) so that a high CPU resource consumption caused by local frequent unpacks resulting from too many data packet can be prevented, applying an access lock to the data of the common queues before retrieving the decoded I frame, and releasing the access lock from the data of the common queues after the decoding of the I frame is completed;

determining an amount of the data packets presently stacked in the common queues by the independent decoding thread T2 before retrieving the data each time in the decoding process, directly transmitting a RTP data packet rate control command to a data send side by a real time control protocol signal of the independent decoding thread T2 if the amount of the data packets stacked in the common queues is greater than thirty data packets (a threshold value) so as to ask for lowering transmission speed of the RTP data packet, and preventing insufficient cache from being happened; and performing an encoding process according to the above-described steps.

With the simultaneous decoding of several data of the present invention, the problems such as data accumulation, frequent receiving packet and waiting, and high CPU resource consumption caused by the receiving and decoding processes which are serially passed through the same channel can be prevented. Further, with the decoding thread to request the transmission speed of the RTP data packet of the data send side according to the current data accumulation, it is therefore that the whole transmission bandwidth is controllable.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A video implementation method for a three-party video conference, characterized in that the video implementation method comprises the steps of:

in a first step, constructing sockets of real-time transport protocol receive-in ports in connection with conference-participant parties 'A' and 'C' and performing monitoring and waiting by a host party 'B';

in a second step, using the host party 'B' to sample a video picture thereof and displaying a video of the host party 'B' in a display region corresponding to the host party 'B' on a monitor of the host party 'B';

in a third step, receiving real-time transport protocol data transmitted from the conference-participant party 'A' by the host party 'B' and displaying a video of the conference-participant party 'A' in a display region corresponding to the conference-participant party 'A' on the monitor of the host party 'B' when the real-time transport protocol data are decoded;

in a fourth step which is simultaneously performed with the third step, receiving real-time transport protocol data transmitted from the conference-participant party 'C' by the host party 'B' and displaying a video of the conference-participant party 'C' in a display region corresponding to the conference-participant party 'C' on the monitor of the host party 'B' when the real-time transport protocol data are decoded;

in a fifth step, capturing an united display region which the united display region is consisted of the display regions of the host party 'B' and the conference-participant parties 'A' and 'C' of the three parties on the monitor thereof by the host party 'B' to be packed into a real-time transport protocol data packet and to be respectively transmitted to the real-time transport protocol receive-in ports of the conference-participant parties 'A' and 'C' while negotiating network parameters; and in a sixth step, decoding the screen-captured real-time transport protocol data transmitted from the host party 'B' by the conference-participant parties 'A' and 'C' to respectively display on monitors of the conference-participant parties 'A' and 'C'.

2. The video implementation method for the three-party video conference as claimed in claim 1, it is characterized to further separate a receiving-sending packet processing step from an encoding-decoding processing step:

after the sockets of real-time transport protocol receive-in ports for the conference-participant parties 'A' and 'C' are constructed in the first step, constructing an independent thread T1 by the host party 'B' to receive the real-time transport protocol data packet coming from the conference-participant parties 'A' or 'C' and to respectively place the real-time transport protocol data packets coming from the conference-participant parties 'A' and 'C' in two different common queues, applying an access lock to the data of the common queues before the independent thread T1 receives the real-time transport protocol data packet coming from the conference-participant parties 'A' or 'C', releasing the access lock from the data of the common queues after the independent thread T1 receives the real-time transport protocol data packet coming from the conference-participant parties 'A' or 'C', and utilizing the access lock perform access synchronization together with a following decoding thread;

providing another independent decoding thread T2 to acquire the data in the two common queues by timing, retrieving all data from the two common queues to simultaneously decode a plurality of data packets related to an entire frame of pattern to determine an amount of the data packets presently stacked in the common queues before retrieving the data each time, removing a central non-critical frame to directly decode I frame by the independent decoding thread T2 if the amount of the data packets stacked in the common queues is greater than a threshold value, applying an access lock to the data of the common queues before retrieving the decoded I frame, and releasing the access lock from the data of the common queues after the decoding of the I frame is completed;

determining an amount of the data packets presently stacked in the common queues by the independent decoding thread T2 before retrieving the data each time in the decoding process, directly transmitting a real-time transport protocol data packet rate control command to a data send side by a real time control protocol signal of the independent decoding thread T2 if the amount of the data packets stacked in the common queues is greater than a threshold value so as to ask for lowering transmission speed of the real-time transport protocol data packet; and performing an encoding process according to the above-described steps.

* * * * *